United States Patent [19] [11] 3,845,724
Boocock et al. [45] Nov. 5, 1974

[54] RAILWAY CAR CENTRIFUGAL FORCE STABILIZING DEVICE

[75] Inventors: David Boocock; Alan J. Bing; Kevin S. Preston, all of London, England

[73] Assignee: British Railways Board, London, England

[22] Filed: Jan. 10, 1972

[21] Appl. No.: 216,504

[52] U.S. Cl............... 105/164, 105/4 R, 105/171, 105/190 R, 105/199 R, 105/210
[51] Int. Cl........... B61f 3/12, B61f 5/10, B61f 5/24
[58] Field of Search........ 105/164, 171, 199 R, 210, 105/4 R, 190 R

[56] References Cited
UNITED STATES PATENTS

| 2,505,256 | 4/1950 | Poage | 105/210 |
| 2,520,944 | 9/1950 | Lynn et al. | 105/164 X |
| 2,523,113 | 9/1950 | Hanna et al. | 105/210 |
| 2,568,402 | 9/1951 | Lynn | 105/164 X |
| 2,960,941 | 11/1960 | Yaotzuli | 105/164 |
| 3,628,465 | 12/1971 | Dobson et al. | 105/164 X |
| 3,631,810 | 1/1972 | Bing | 105/164 X |
| 3,687,085 | 8/1972 | Newman et al. | 105/171 |
| 3,695,186 | 10/1972 | Herring, Jr. | 105/171 |

Primary Examiner—M. Henson Wood, Jr.
Assistant Examiner—Howard Beltran
Attorney, Agent, or Firm—Elliott I. Pollock

[57] ABSTRACT

This device relates to a tracked vehicle in which a vehicle body is carried on a supporting frame which is itself supported on one or more track followers through a lateral suspension. A tilting mechanism is provided to tilt the vehicle body relative to the supporting frame simultaneously with a lateral displacement of the frame relative to the track followers under centrifugal force when the vehicle is rounding a corner. The device is specifically related to the provision of a bump-stop arrangement to limit lateral suspension movements under transient forces but to allow the lateral suspension to move freely under centrifugal forces when the vehicle is cornering.

5 Claims, 6 Drawing Figures

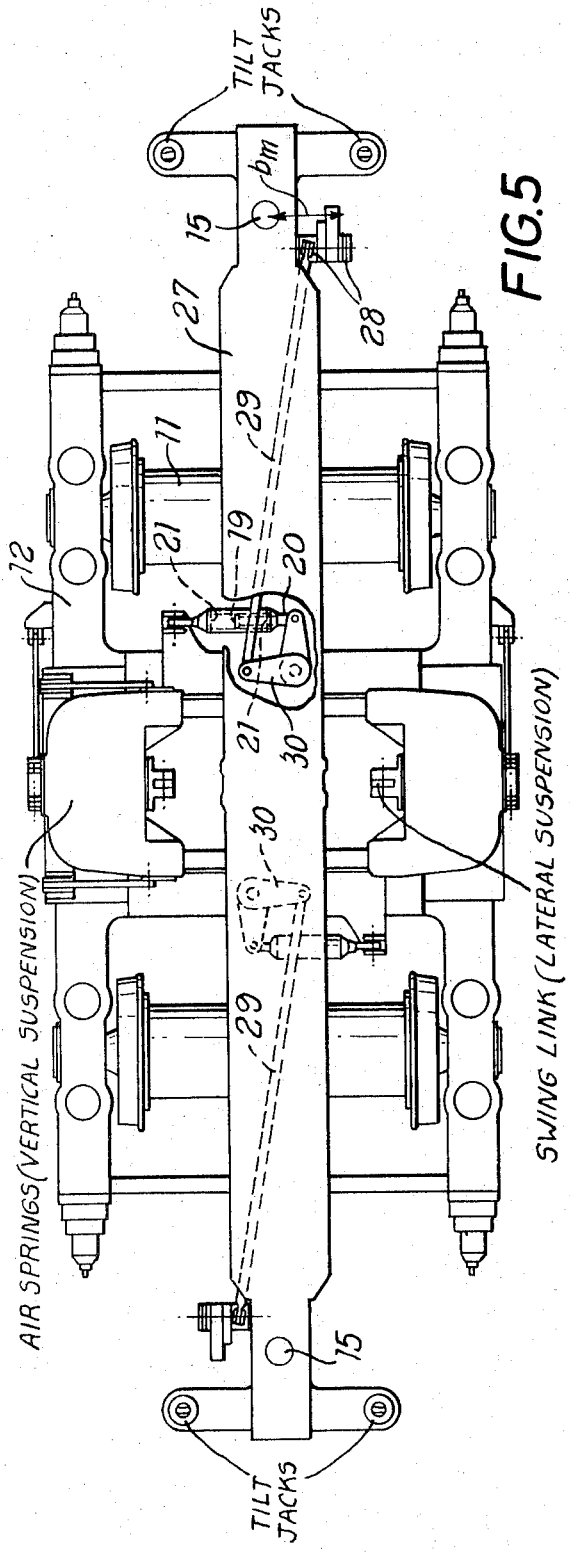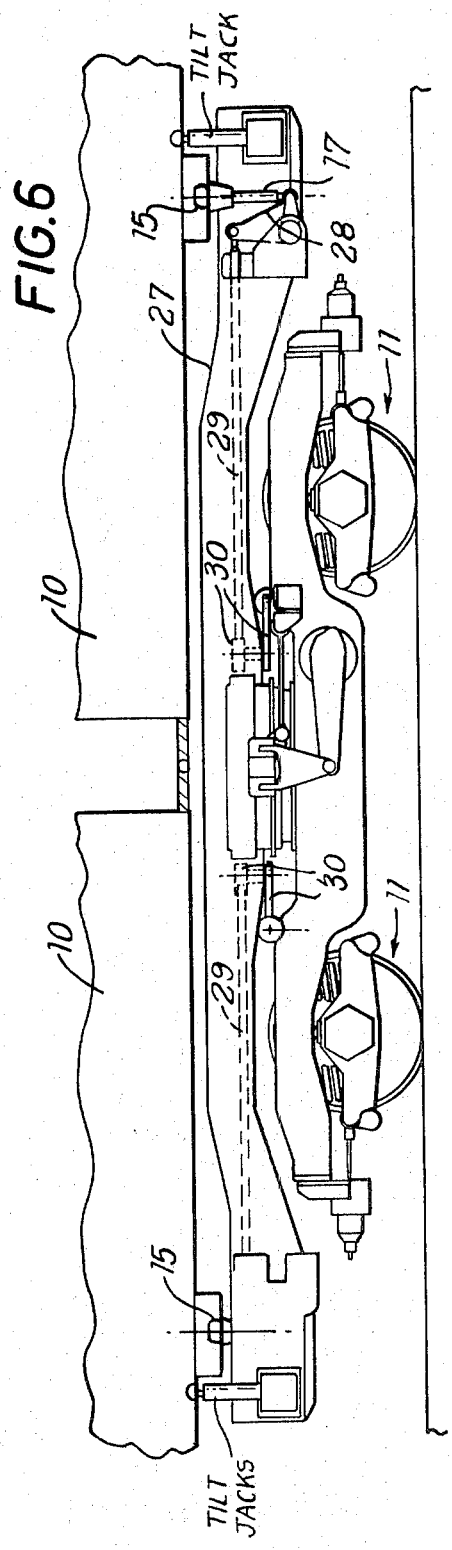

RAILWAY CAR CENTRIFUGAL FORCE STABILIZING DEVICE

BACKGROUND OF THE INVENTION

The present invention is applicable to all forms of tracked vehicles, not only to railway vehicles. It is particularly applicable to those which tilt on curves.

Vehicles, such as railway vehicles, tracked hovercraft, etc, which are constrained to move along a guideway, are bounded by a space envelope (loading gauge) in which the vehicles must be contained if they are not to strike trackside structures, tunnels, etc. Since a vehicle is provided with a lateral suspension, to provide an acceptable ride for its passengers and reduce structural stresses, dynamic lateral movements of the vehicle body occur with respect to the track. These must be controlled within specified limits, so that the governing space envelope is not violated. The accepted practice for fulfilling this requirement is to limit the deflections of the suspension springs by fitting bump stops.

While this simple solution is available for non-tilting vehicles, it may not be adequate for vehicles which tilt. The problem of the tilting vehicle will now be discussed.

When a vehicle traverse a curve, it and its passengers experience centrifugal forces. To counterbalance these forces, and so increase the speed at which passengers start to be subjected to unacceptable discomfort, it is usual to cant the track. As there are practical limits to the amount the track may be canted, further increases in speed necessitate tilting of the vehicle body relative to the track. The angle of tilt is preferably that which reduces the net lateral acceleration felt by the passengers to zero.

The introduction of a tilt suspension can introduce difficulties in maintaining the vehicle body within the governing space envelope. In general it is desirable for the body to tilt about a fixed axis within the space envelope, this tilt axis preferably being chosen so as to maximize the body cross-section within the evelope. Dynamic lateral movements of the body are then defined as displacements of the tilt axis datum. The ease with which the body can be maintained within the space evelope depends on the relationship between the tilt and lateral suspensions. There are two basic configurations.

The first configuration has the tilt suspension below the lateral suspension. In this arrangement the lateral suspension deflects only in response to dynamic lateral forces on the body and not to centrifugal forces. Hence, the position of the body tilt axis may be constrained within its permitted range by simply fitting bump stops to the lateral suspension springs, as in a non-tilting vehicle.

The second configuration, has the tilt suspension above the lateral suspension. In this arrangement the lateral suspension is fitted between the track follower and a platform which is stiffly constrained in tilt to the track follower. This anti-tilt platform carries the tilt mechanism and supports the body. Since the lateral suspension is exposed not only to dynamic lateral forces but also to unbalanced centrifugal forces (resulting from the deficiency in the cant of the track), the position of the body tilt axis depends on the stiffness of the lateral suspension between the track follower and the anti-tilt platform. The allowable lateral suspension travels must in general be relatively large, since they must accommodate body dynamic forces and unbalanced centrifugal forces. Because of this and the difficulty of distinguishing between the two sources of lateral displacement, bump stops restricting the maximum lateral spring deflections are usually not adequate to constrain the body tilt axis within acceptable limits. Consequently, with the tilt-above-lateral suspension configuration, more complex devices must be fitted to properly constrain the vehicle body within the governing space envelope.

SUMMARY OF THE INVENTION

According to the present invention there is provided a tracked vehicle comprising a vehicle body carried by a support member and supported on one or more track followers through a lateral suspension permitting the support member to move laterally of the track follower against a predetermined stiffness of the lateral suspension, connecting means between said support member and the vehicle body constraining the support member to move laterally with the vehicle body under centrifugal force by an amount related to the stiffness of said lateral suspension and permitting lateral tilting of said body relatively to said support member, and actuating means arranged to tilt said vehicle body relatively to said support member through an angle related to the centrifugal force simultaneously with the lateral displacement thereof, the arrangement being such that the effective tilt axis of said body lies in the central longitudinal plane of the vehicle body perpendicular to the floor of the vehicle body. Bump stop means are provided to limit lateral suspension movements in response to transient forces, and a control member operates to detect the angle of tilt of the vehicle body relative to the support member and to translate this into a lateral movement of the lateral suspension bump stops equal and opposite to lateral movement experienced by the lateral suspension due to unbalanced centrifugal forces.

BRIEF DESCRIPTION OF THE DRAWINGS

Preferred embodiments of the present invention will now be described with reference to the accompanying drawing in which:

FIGS. 5 and 6 are plan and side views respectively of a specific embodiment of the invention which is illustrated diagrammatically in FIG. 4.

DESCRIPTION OF THE PREFERRED EMBODIMENTS

Before considering bump stop devices, it is first necessary to understand the geometry of suspensions having the tilt suspension above the lateral suspension. A suspension embodying this geometry is described in Bing U.S. which is incorporated herein by reference Pat. No. 3,631,810.

Figure 1:
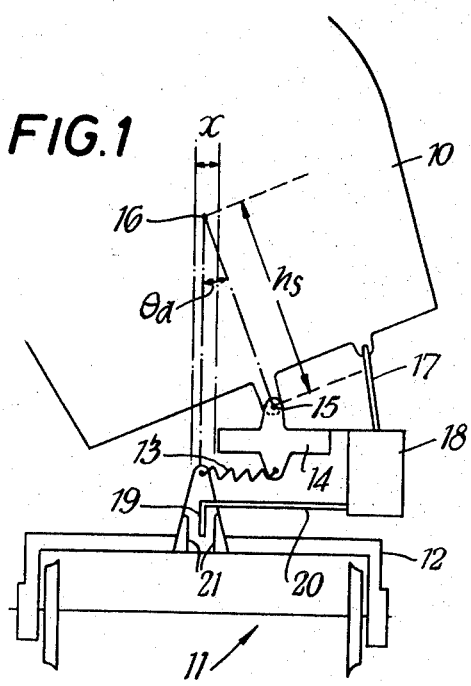
FIG. 1 is a schematic cross-section through a tracked railway vehicle.

In FIG. 1, a vehicle body 10 is supported on a wheelset 11, mounted in a wheelset frame 12, through a lateral suspension, illustrated diagrammatically as a spring 13. The body 10 is pivotally mounted on a support member taking the form of an anti-tilt platform 14, by way of a joint 15. In FIG. 1 it is assumed that the vehicle 10 is traversing a curve and is subjected to steady unbalanced centrifugal forces, owing to an angular deficiency of $\theta_d$ in track cant. This deficiency is detected by a tilt mechanism (not shown), which then tilts the body 10 relative to the track through an angle $\theta_d$. The net lateral acceleration on the passengers is thus zero.

In response to the unbalanced cnetrifugal force, the anti-tilt platform 14 is displaced sideways on the lateral suspension 13 by a distance of approximately $W\theta_d k_y$, where $W$ is the weight suspended above the lateral suspension and $k_y$ is the stiffness of the suspension. It is apparent that the height of the body tilt axis above the tilt pivot 15 on the anti-tilt platform 14 is $h_s = W/k_y$, $\theta_d$ being small. In order to set the tilt axis 16 at its required position within the governing space envelope, it follows that the lateral suspension stiffness and tilt pivot position must be adjusted to suit. If swing links are used to provide the lateral suspension spring, their length is $h_s$.

The "stiffness" of the lateral suspension refers to the restoring force which is applied by the lateral suspension to the coach body if it sould move laterally away from a mean position over the wheelsets. The stiffer the suspension the greater is the restoring force for a unit lateral displacement. In the case of a swing link lateral suspension, this stiffness is proportional to the weight of the vehicle body divided by the length of the swing link. If a swing link is considered to be a pendulum, it can be readily understood that the shorter the length of the pendulum the greater is the vertical rise of the end of the pendulum for a given lateral displacement of the end, and it is this vertical lift which acts on the vehicle body which provides the restoring force to return the swing linkto its mean vertical position. In order to predetermine the stiffness of a lateral suspension which incorporates swing links therefore, assuming that the weight of the vehicle body remains the same, adjustments can be made to the length of the swing link to lengthen or shorten them in dependence upon the required stiffness.

In the embodiment shown in FIG. 1, the lateral suspension is shown diagrammatically by a horizontally positioned spring 13. Clearly the stiffness of the lateral suspension is determined by the stiffness of this spring 13. In lateral suspensions which actually employ horizontal positioned springs in this manner, predetermined stiffness of the lateral suspension is determined by the stiffness of this spring and springs of the same nominal length but of different stiffness can be prepared, assuming them to be coil wire springs, by increasing the dimension of the wire forming the coil.

In order to determine what the stiffness of the lateral suspension should be, the calculation has to be made which determines the force necessary to prevent the coach bodies from moving more than a given maximum distance laterally on the basis of a vehicle body of given weight traveling at the maximum speed of the vehicle round a corner of minimum radius on the track to be traveled by the train. The sharper the radius of the corner, the greater will be the centrifugal force causing the coach body to move laterally, and consequently the stiffness of the lateral suspension must be sufficient to resist this centrifugal displacement.

The aim of the bump stop device according to the present invention is to limit dynamic lateral suspension movement by stops whose position is defined by the subtraction of quasi-static suspension displacements due to cant deficiency and tilt from the total suspension displacements. The principle of such device is illustrated in FIG. 1.

Some form of tilt signal is generated by detecting the tilt angle between body 10 and anti-tilt platform 14. In FIG. 1 the tilt signal is represented by the vertical plunge of a tilt signal rod 17, which is offset from the tilt pivot 15. The tilt signal is processed by a device 18 (forms of which will be descussed hereinafter) which causes a bump stop 19 carried on the anti-tilt platform 14 to shift laterally in the same direction and by the same amount as the tilt axis 15 moves laterally with respect to the anti-tilt platform 14, i.e, by $h_s\theta_d$. In FIG. 1 the bump stop is shown to be actuated by a lateral signal rod 20. It follows, therefore, that the tilt axis 16 and bump stops do not move laterally in the quasi-static sense relative to the wheelset frame 12. Hence, the gaps between the bump stop 19 carried on the anti-tilt platform 14 and the mating stops 21 on the wheelset frame 12 define the permitted dynamic movement indicated as '$x$'in FIG. 1, of the body 10 and anti-tilt platform 14.

It is desirable to include as part of a lateral suspension a damper (not shown) which damps out dynamic lateral movements of the body 10. By mounting the damper between the bump stop 19 carried by the anti-tilt platform 14 and the bump stops 21 on the wheelset frame 12, dynamic lateral movements are damped, leaving quasi-static tilt motions undamped. This feature of the suspension may be used to advantage.

Since the essence of the invention is the convertion of a tilt signal input into a mechanical lateral output in accordance with an exact (or approximate) geometric relationship, numerous devices can be used. These include mechanical, electro-mechanical, hydro-mechanical, etc, device.

Figure 2:
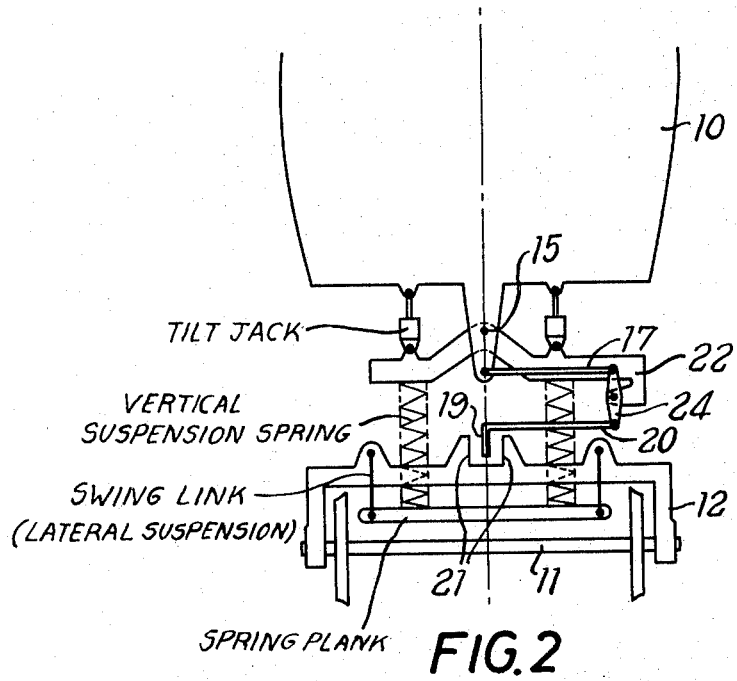
FIG. 2 is a schematic illustration of one arrangement of a bump-stop mechanism.

In the embodiment shown in FIG. 2 the vehicle body 10 is supported on an anti-tilt platform 22 by way of a pivot joint 15. A lever arm 23 connected to the vehicle body 10 extends below the pivot joint 15 and is connected to one end of the roll signal rod 17 which extends laterally of the vehicle. The other end of the rod 17 is connected to one arm of a two arm lever 24 which is pivotally mounted on the frame 22 so as to pivot in a vertical plane transversely of the vehicle. The lateral signal rod 20 is connected at one end to the other arm of the lever 24.

The bump stop 19 on the other end of the rod 20 is positioned between bump stops 21 on the wheelset frame 12, which in this case will be the bogie frame. In this embodiment the lever 24 constitutes the bump-stop device 18.

Figure 3:
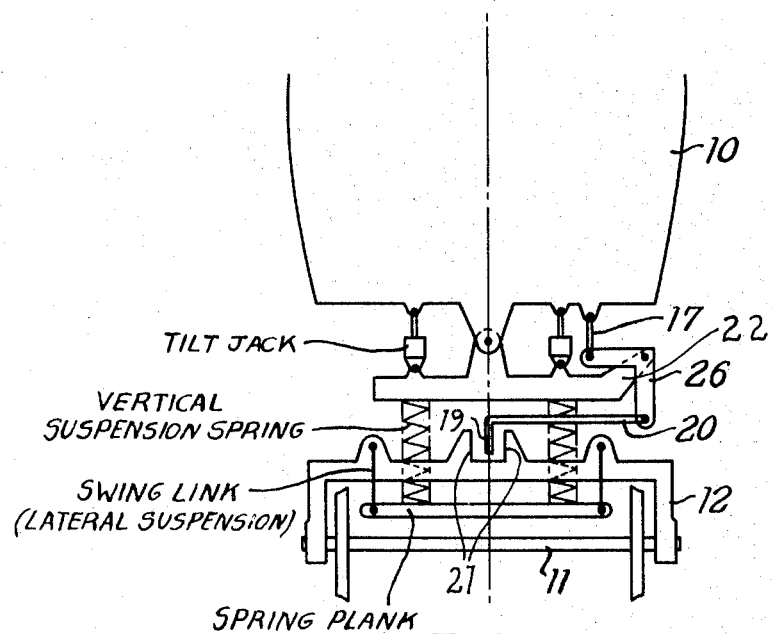
FIG. 3 is a schematic illustration of a second arrangement of a bump-stop mechanism.

An alternative arrangement, similar to that shown in FIG. 2, is shown in FIG. 3. As before the vehicle body 10 is supported on an anti-tilt platform 22 by way of a pivot joint 15.

The roll signal rod 17 is arranged vertically and is connected at one end to the body 10 at a point laterally displaced from the pivot point 15. The other end of the rod 17 is connected to one arm of an 'L' shaped two arm lever 26 which is pivotally mounted on the platform 22. The other arm of the lever 26 is connected to one end of the lateral signal rod 20 which as before carries the bump stop 19 on its other end, positioned between bump stops 21 on the wheelset frame 12.

The lateral suspension bump-stop mechanism described above can be applied to the arrangement when a pair of railway vehicles are interconnected by a beam articulated at its ends to the two vehicle bodies at a distance from the ends of said bodies, the lateral suspension being connected between this beam and at least one supporting wheelset. Such an arrangement is described in the specification of Newman et al. U.S. Pat. No. 3,687,085 which is incorporated herein by reference.

Figure 4:
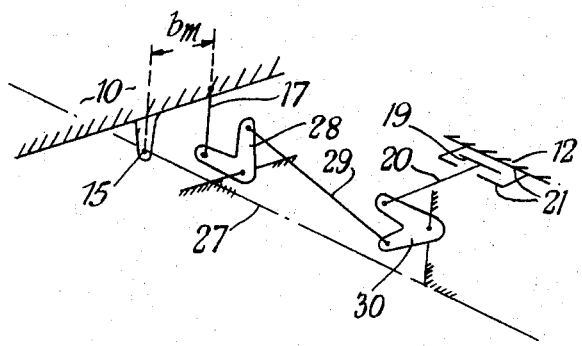
FIG. 4 is a schematic illustration of a third arrangement of a bump-stop mechanism.

A bump-stop mechanism for use with such an arrangement is illustrated in FIGS. 4, 5 and 6. A vehicle body 10 is mounted on a support member taking the form of a beam 27 being connected to it by way of pivot joint 15. The beam 27 constitutes the anti-tilt platform 14 shown in FIG. 1.

As shown in FIGS. 5 and 6 the beam 27 is supported on the wheelset frame 12 by a vertical suspension, provided by vertically acting air springs, and a lateral suspension, provided by vertical swing links, in a manner analogous to that shown in FIGS. 2 and 3.

A two-arm lever 28 is pivotally mounted on the beam 27 so as to pivot in a vertical plane parallel to the longitudinal axis of the beam. The tilt signal rod 17 is connected between the body 10 and one arm of the lever 28.

The other arm of the lever 28 is connected by a rod 29 to one arm of a second two-arm lever 30. This lever 30 is mounted on the beam 27 so as to pivot about a vertical axis. The lateral signal rod 20 is connected to the other arm of the lever 30 and carries the bump stop 19 on its outer end, which is positioned between a pair of bump stops 21 on the wheelset frame 12. In the arrangement shown in FIGS. 5 and 6 the rod 29 passes down inside the center of the beam 27 which is in the form of a hollow box girder.

The two levers 28 and 30 and the interconnecting rod 29 constitute the bump-stop device 18 of FIG. 1. By choosing appropriate ratios of the lengths of the two arms of each of the levers 28 and 30 and of the lateral distance '$bm$' between the pivot point 15 and the point of connection of the rod 17 to the body 10, vertical movements of the rod 17 relative to the beam 27 when the body 10 is tilted are translated into transverse movements of the rod 20 which are equal and opposite to the displacement of the body relative to the wheelset frame 12 under the action of centrifugal forces. This movement of the body 10 and beam 27 relative to the wheelset frame 12 is against the stiffness of the lateral suspension determined by the length of the swing links.

We claim:

1. In a tracked vehicle of the known type wherein a vehicle body is pivotally connected to a support member which is supported on at least one track follower, operative to guide said vehicle for restrained lateral motion along a track, through a lateral suspension permitting the support member to move laterally of the track follower against a predetermined stiffness of the lateral suspension, and wherein the support member is constrained to move laterally with the vehicle body under centrifugal force by an amount related to the stiffness of said lateral suspension while permitting lateral tilting of said body relative to said support member, means being provided to tilt said vehicle body relatively to said support member through an angle related to the centrifugal force simultaneously with the lateral displacement thereof so that the effective tilt axis of said body lies in the central longitudinal plane of the vehicle body perpendicular to the floor of the vehicle body, the improvement comprising at least two bump stop members mounted for movement relative to one another and operative upon engagement with one another to limit lateral suspension movements in response to transient forces, one of said bump stop members being mounted at a fixed position relative to said track follower, and the other of said bump stop members being mounted for movement relative to said fixed one of said members, said other of said bump stop members being affixed to a mechanical linkage connected to said vehicle body and comprising control means responsive to the angle of tilt of the vehicle body relative to the support member for causing lateral movement of said movable one of said bump stop members relative to said fixed one of said bump stop members by a distance equal and in a direction opposite to the lateral movement experienced by the lateral suspension due to unbalanced centrifugal forces.

2. A vehicle as claimed in claim 1 in which said control means comprises a two arm lever pivotally mounted on said support member so as to pivot about a horizontal axis extending longitudinally of said vehicle body, the first arm of said lever being connected to said body at a point lying in said central longitudinal plane of the body and below the point of connection of said body to the support member, the second arm of said lever carrying a central bump stop member which is positioned between two fixed bump stop members 3. A vehicle as claimed in claim 1 in which said control means comprises a first two arm lever pivotally mounted on said support member so as to pivot about a horizontal axis extending transversely of said vehicle body, a second two arm lever pivotally mounted on said support member so as to pivot about vertical axis, the first arm of said first lever being connected to the vehicle body at a point laterally displaced from the point of connection of said body to the support member, the second arm of said first lever being connected to the first arm of said second lever and the second arm of said second lever carrying a central bump stop member which is positioned between two fixed bump stop members secured to the track follower supporting structure.

4. A vehicle as claimed in claim 1 wherein said track follower comprises at least one wheelset mounted for rotation in a wheelset frame, said fixed one of said bump stop members being attached to said frame.

5. The vehicle of claim 4 wherein a pair of said fixed bump stop members are attached to said wheelset frame in spaced relation to one another, said movable one of said bump stop members being positioned between said two fixed bump stop members for movement in the space between said fixed bump stop members.

* * * * *